(12) United States Patent
Orr

(10) Patent No.: US 11,366,607 B1
(45) Date of Patent: Jun. 21, 2022

(54) PORTABLE RAID ONLINE STORAGE (PROS) UNIT

(71) Applicant: Joseph Bradley Orr, North Holywood, CA (US)

(72) Inventor: Joseph Bradley Orr, North Holywood, CA (US)

(73) Assignee: Joseph Bradley Orr, North Hollywood, CA (US)

( * ) Notice: Subject to any disclaimer, the term of this patent is extended or adjusted under 35 U.S.C. 154(b) by 0 days.

(21) Appl. No.: 17/247,683

(22) Filed: Dec. 20, 2020

(51) Int. Cl.
G06F 3/06 (2006.01)

(52) U.S. Cl.
CPC ............ G06F 3/0658 (2013.01); G06F 3/067 (2013.01); G06F 3/0626 (2013.01); G06F 3/0689 (2013.01)

(58) Field of Classification Search
None
See application file for complete search history.

(56) References Cited

U.S. PATENT DOCUMENTS 4,890,580 A * 1/1990 Owen ................... A01M 29/18
119/650
9,405,336 B1 * 8/2016 Li ............................ G06F 1/182

FOREIGN PATENT DOCUMENTS

CN 105228343 A * 1/2016
KR 2006065548 A * 6/2006 ......... G02F 1/13452

OTHER PUBLICATIONS

"TBS-453A 4-Bay M.2 SSD NASbook", (c) 2016 QNAP Systems, Inc. pp. 1-15.*
"QNAP Turbo NAS Software User Manual", (c) 2017 QNAP Systems, Inc, pp. 1-327.*
"Structured Computer Organization", (c) 1984 Prentice-Hall, Inc. pp. 10-12.*
MSI GS 8RF Stealth User's Manual G01_MS_16Q2_v1.0_English, (c)Apr. 2018, p. 1-60.*
"MSI GS65 8RF Stealth Thin (i7-8750H, GTX 1070 Max-Q, Full HD) Laptop Review", (c) May 9, 2018 NotebookCheck.net, p. 1-19.*
Ciphertex Data Security. https://ciphertex.com/product/cx-ranger-ex/ Single product Desktop Raid system with a handle on top to move the device.

* cited by examiner

Primary Examiner — Brian R Peugh

(57) ABSTRACT

The Portable Raid Online Storage (PROS) Unit is a new design in mobile storage. It is the first completely portable and completely self-contained Raid Storage system using a chipset with a Raid Controller, Memory and IOP chips. IO uses a PCIe path using a USB-C (usb 3.1) connector. It is made to go into the field with, and sit under the host computer thus taking very little space. It provides up to 14TBs of Raid 0, 1, or Raid 5 parity storage. Raid 5 will work with Parity to protect the data in case of a Drive Failure. The PROS unit will use NVMe SSD Drives for faster read/write. The size of the device is 14 inches by 9 inches by ~0.5 inches. Or 35.56 cm×22.86 cm×13 mm. The PROS Unit will be powered via the USB-C port to a 120 v AC power source.

4 Claims, 5 Drawing Sheets

PORTABLE RAID ONLINE STORAGE (PROS) UNIT

BACKGROUND

Data Raid Storage systems, used primarily for Online and Offline Video Editing, have always been made in larger enclosures and set up for use in an indoor editing bay or large desk for use on a desktop computer. These Raid systems, by virtue of their hardware structure and the size of the hard drives that have been used, (3.5" and 2.5" respectively) need to be in a larger enclosure. This is because the drive connections require a proprietary connector on a PCB (Printed Circuit Board). And, because the PCB with that formfactor needs power, each drive in the Raid enclosure requires its own PCB. Cables from those boards then go to a backplane PCB in a different part of the enclosure which housed all of the controller chips that made up the Raid System.

Online Video Editing means that the editing, effects and coloring of a digital medium (moving pictures or Video) happens on one main computer. Offline editing means the video is cut on one machine by an offline editor, but the finished cut (done by an online editor), effects and coloring are done on other systems. All of which needed to be done in an office. The Data Raid Storage systems used by these editors connect to computers either via cables directly to the Raid Unit (DAS—Direct Attached Storage) if the Raid controller box is on or near their Desk, or via cables to a Computer Server that controls a group of Raid controllers. (NAS—Network Attached Storage)

However, new technology has allowed changes to the hardware setup because of the way the Hard Drives power requirements have changed. Now, the entire system can exist on one PCB and fit inside a small portable enclosure for use in the field. This Portable Raid Online Storage system, which uses DAS, is what I have invented and am presenting here.

SUMMARY

The Portable Raid Online Storage (PROS) Unit: herein called the PROS Unit, is a new design in mobile storage (FIG. 1). It is the first completely portable and completely self-contained Online Raid Storage system that includes; a Raid Controller, Memory, PCIe chips and the NVMe (Non-Volatile Memory Express) m.2 Flash Drive connectors, all on one PCB board (herein called MCB—Main Controller Board). The SSD Flash Drives (not included in the PROS Unit) get their power from the NVMe connector thus negating the need for internal power units, extra cabling and proprietary PCB boards for each Drive. The PROS Unit is made to go into the field with, and sit under any portable host computer thus taking very little space while being able to do professional Online Video Editing in the field (see FIG. 5). The PROS unit will hold up to eight NVMe SSD Flash Drives (not included) for faster read/write speeds and will utilize up to 14TBs of Raid 0, 1, and Raid 5 or 6 parity storage. (Raid 5 and 6 will work with Parity to protect the data in case of a Drive Failure)

The PROS Unit will be powered via the USB-C port from a 120 v AC power source. Total Wattage of the PROS Unit TBD but will most likely not exceed 110 watts. The watts needed will come from a power brick external to the PROS Unit.

BRIEF DESCRIPTION OF DRAWINGS

FIG. 5: PROS Unit shown with Lid on

DETAILED DESCRIPTION OF DRAWINGS

Figure 1:
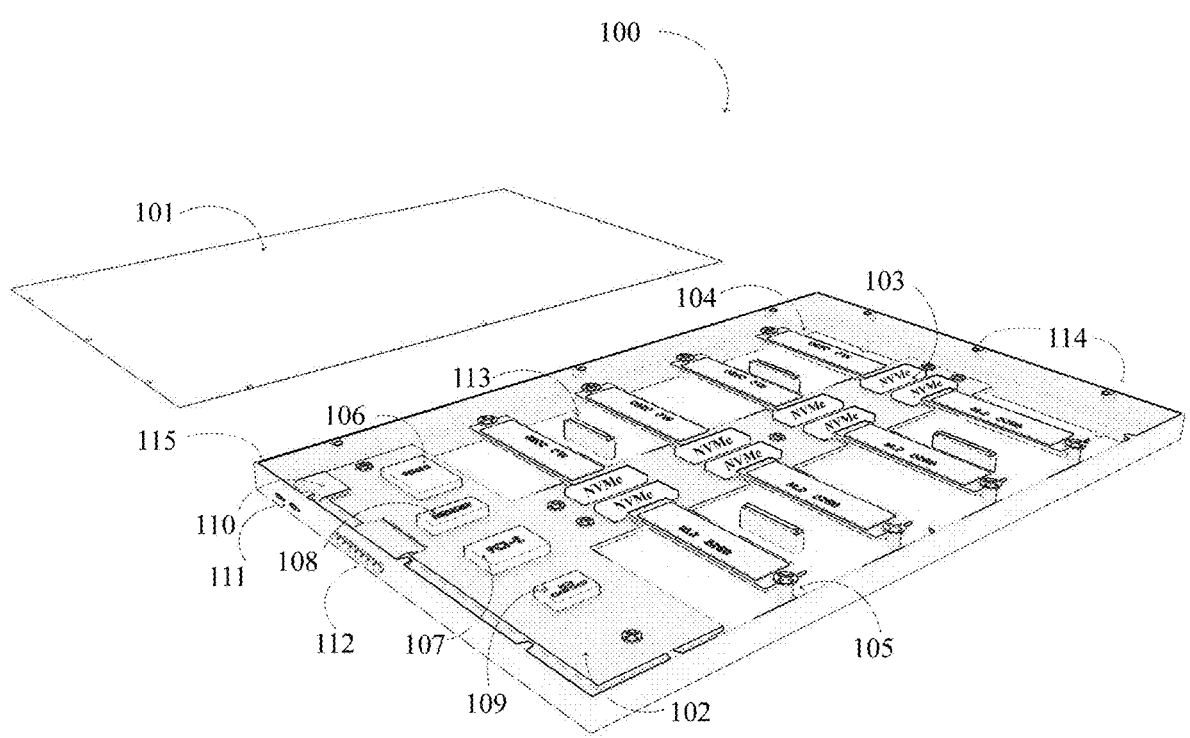
FIG. 1: Portable Raid Online Storage (PROS) Unit (Flash Drives installed for reference only) Lid off—angled view

FIG. 1: Main Controller Board (MCB) shown inside the Enclosure 100. Drives are shown for reference purposes only. The Lid is shown at the top of the image 101.

The MCB is in a "T" configuration 102. This is so the Non-Volatile Memory Express (NVMe) m.2 connectors 103 can be on the same PCB as the main system computer chips. (This is possible because the drives do not require a separate power source.)

The long part of the "T" holds eight NVMe m.2 connectors 103 which will connect the Flash Drives 104 (not included) to the MCB 102 and be held to the enclosure by screws 105. Since these NVMe connectors provide power to the Flash Drives no extra power supply or cabling is needed.

The short part of the "T" holds all of the system chips.

The system chips include the Power chip 106, PCIe chip 107, Memory chip 108 and the Raid Controller chip 109 along with all the other transistors and resistors that make up the electrical system.

The Power control chip 106 determines and controls the power needs of the system.

The Memory chip 108 keeps the Raid system configuration information and Data Recovery information.

The PCIe chip 107 controls the pathway and speed of data running from and to any connected computer.

The Raid Controller chip 109 creates (with proper firmware and software) the Raid System the user configures (Raid 0, Raid 1 and Raid 5 or 6 parity). It also maintains that system as needed and helps with any data recovery, if necessary.

The left upper side of the enclosure shows the ports 111 which will house the USB-C connectors which will connect to power and to the computer with the proper USB-C formfactor cables.

The left center side of the enclosure shows eight small lights 112. These lights show the status of the eight Flash Drives. Green indicates drives are working properly, orange indicates an issue with that particular drive.

The inside of the enclosure has four bumpers 113 so the lid will not hit the MCB or Flash Drives. They are shown next to several of the Flash Drives.

The Lid 101 is set in place by screws that go into small protruding studs 114 (three on each side of the enclosure).

The Enclosure 115 itself measures: Length 35.56 cm—Width 22.86 cm—Depth 13 mm—Wall Thickness 1.5 mm—Bottom Thickness 1.5 mm.

Figure 2:
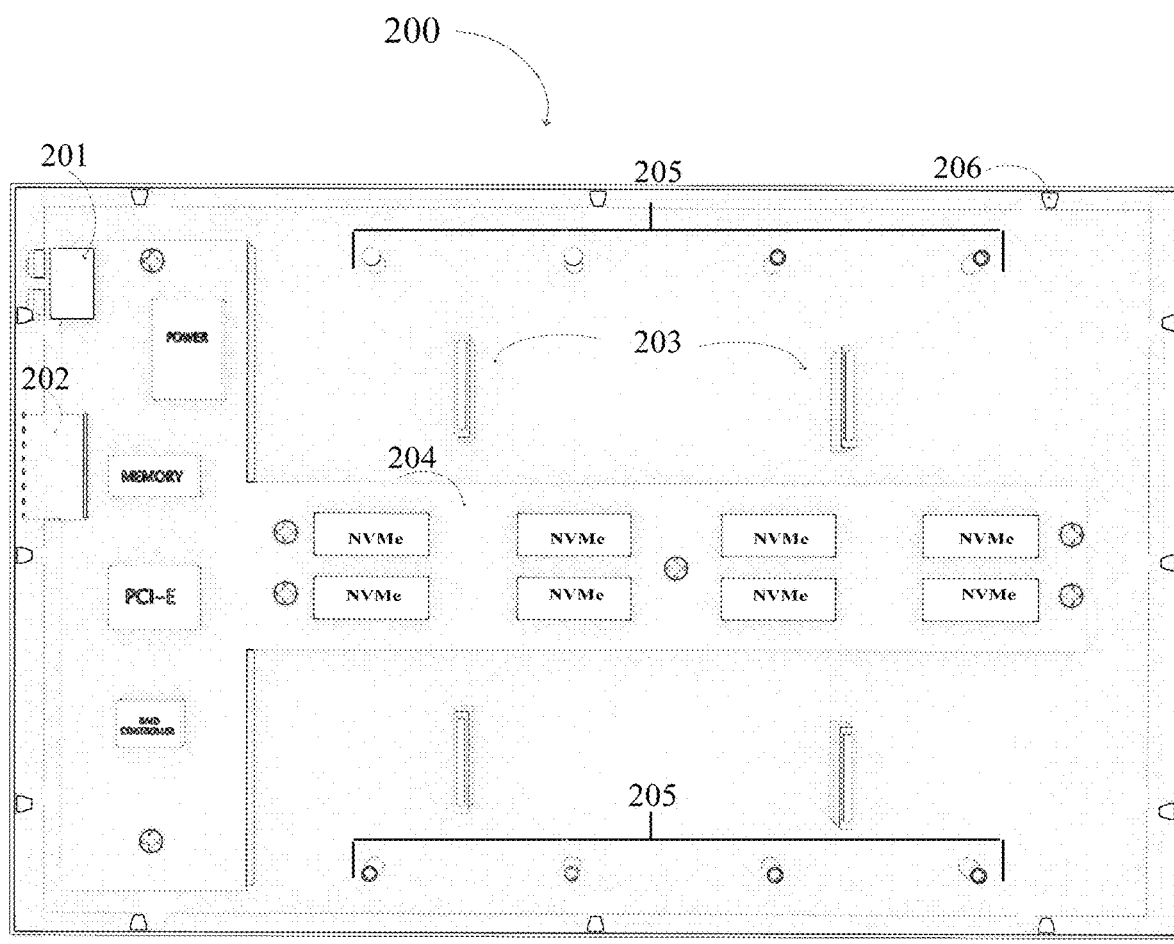
FIG. 2: Portable Raid Online Storage (PROS) Unit without Flash Drives with Lid off—top view.

FIG. 2: MCB shown inside the enclosure 200—top view (without drives installed).

The top left of the short "T" shows the USB-C power board 201 connected to the MCB board.

The middle of the short "T" shows the status light ribbon 202 connected to the MCB board.

Four bumpers 203 are shown between several of the Flash Drives. These bumpers are to stop the Lid from hitting the MCB or Flash Drives.

The long part of the MCB "T" 204 holds eight NVMe m.2 connectors which will connect the Flash Drives (not included) to the MCB and be held to the enclosure by screws 205.

Screw studs are shown inside the edges of the enclosure 206 (three on each side) for the Lid to screw onto.

Flash Drive Set screw pins 205 are shown along the long part of the enclosure.

Main system chips are shown on the short part of the "T" 204 of the MCB.

Figure 3:
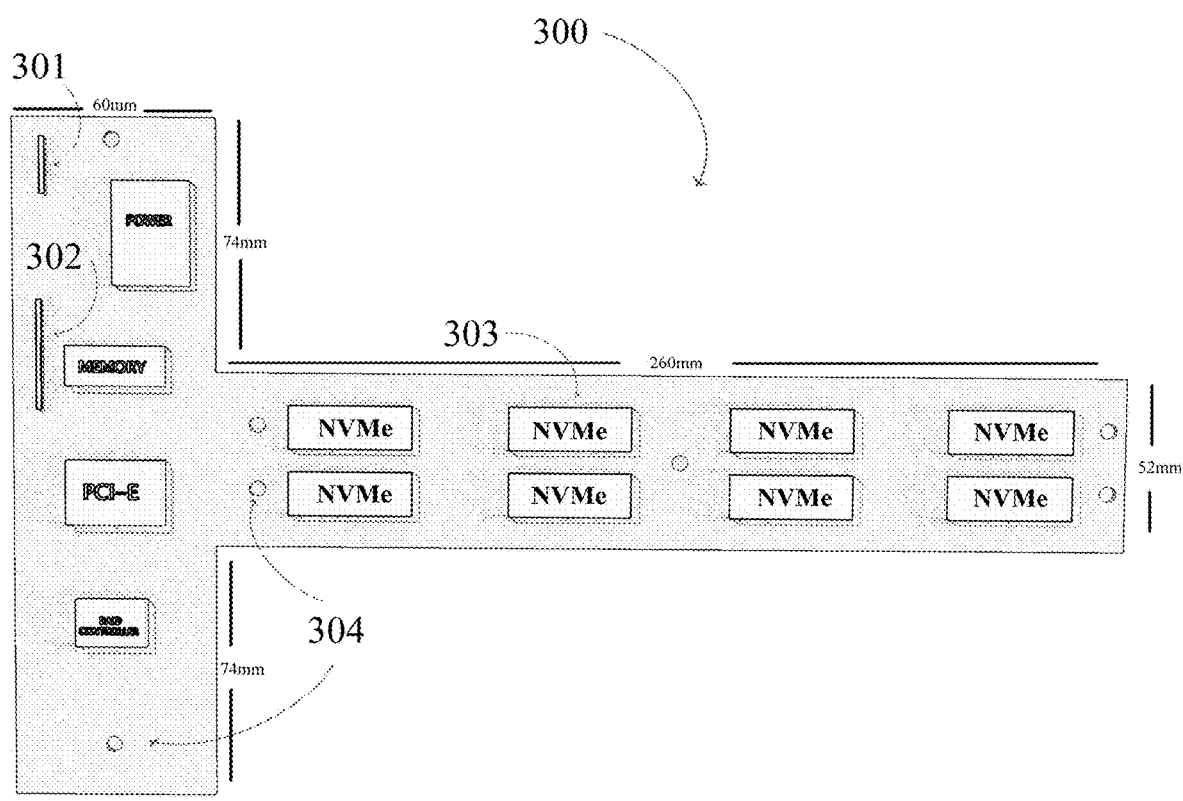
FIG. 3: MCB board only—top view.

FIG. 3: Main Controller Board (MCB) only. Sizes (measurements) of the MCB "T" configuration are shown along the sides of the board. Total length is 320 mm. Total width is 200 mm.

The top left of the short "T" is the power connector 301 for the USB-C connector board.

The middle of the short "T" shows the connector 302 for the status light ribbon connector.

The short part of the "T" shows the system chips. (see FIG. 1 for details)

The long part of the "T" shows the NVMe m.2 connectors 303 (see FIG. 1 for details).

The MCB will be screwed to the enclosure via the screw holes 304

Figure 4:
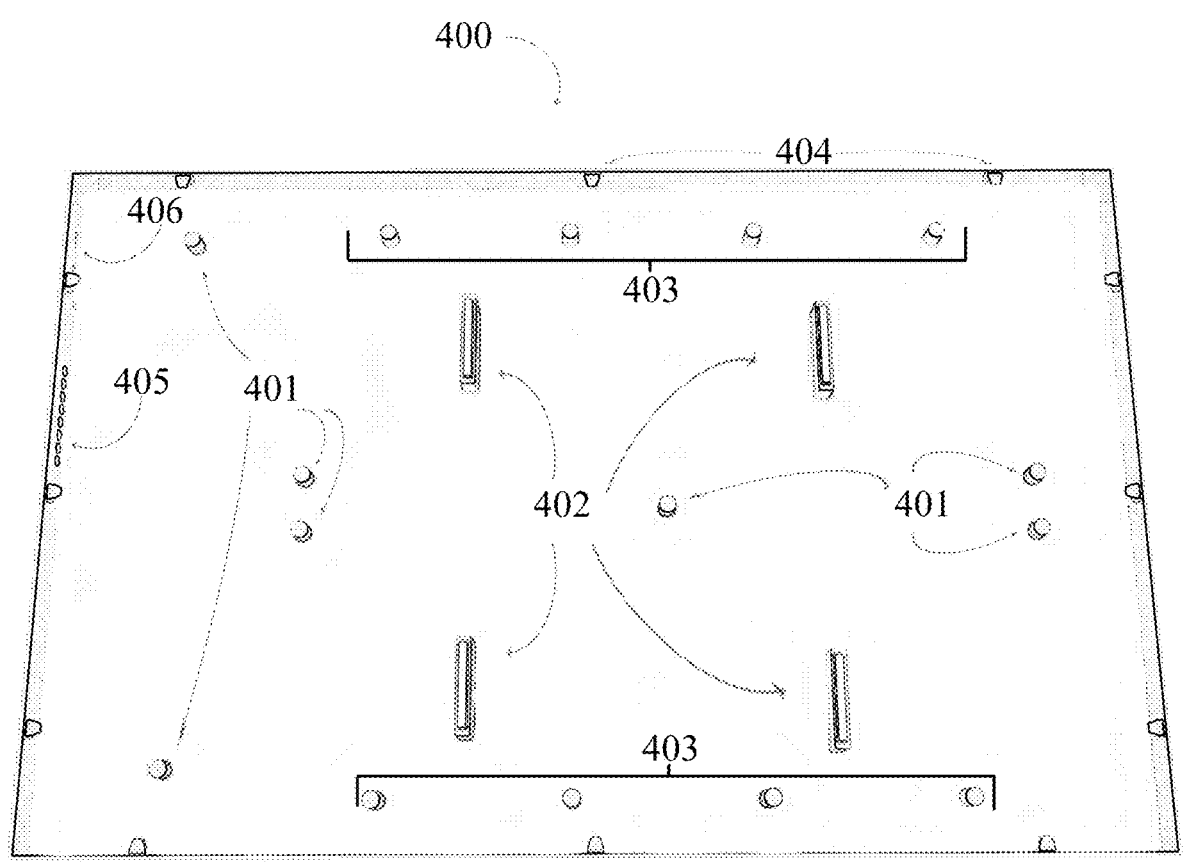
FIG. 4: The Enclosure.

FIG. 4: The Enclosure 400. The enclosure will be made of aluminum. The measurements are: Length 35.56 cm—Width 22.86 cm—Depth 13 mm—Wall Thickness 1.5 mm—Bottom Thickness 1.5 mm.

The support pins for the MCB 401 are H=3 mm×W=6 mm.

The support bars 402 are H=9 mm×W=5 mm×L=30 mm. There is a 1 mm thick rubber bumper on the top of the bars to cushion the lid making the total height 10 mm.

The support pins for the SSD drives 403 are H=6 mm×W=6 mm.

The supports for the lid 404 are set at 1 mm below the top of the enclosure so the lid sits flush. There are three supports on each side for maximum support.

The holes 405 for the status lights are on the middle-left side.

The holes 406 for the USB-C connectors are on the top-left side.

Figure 5:
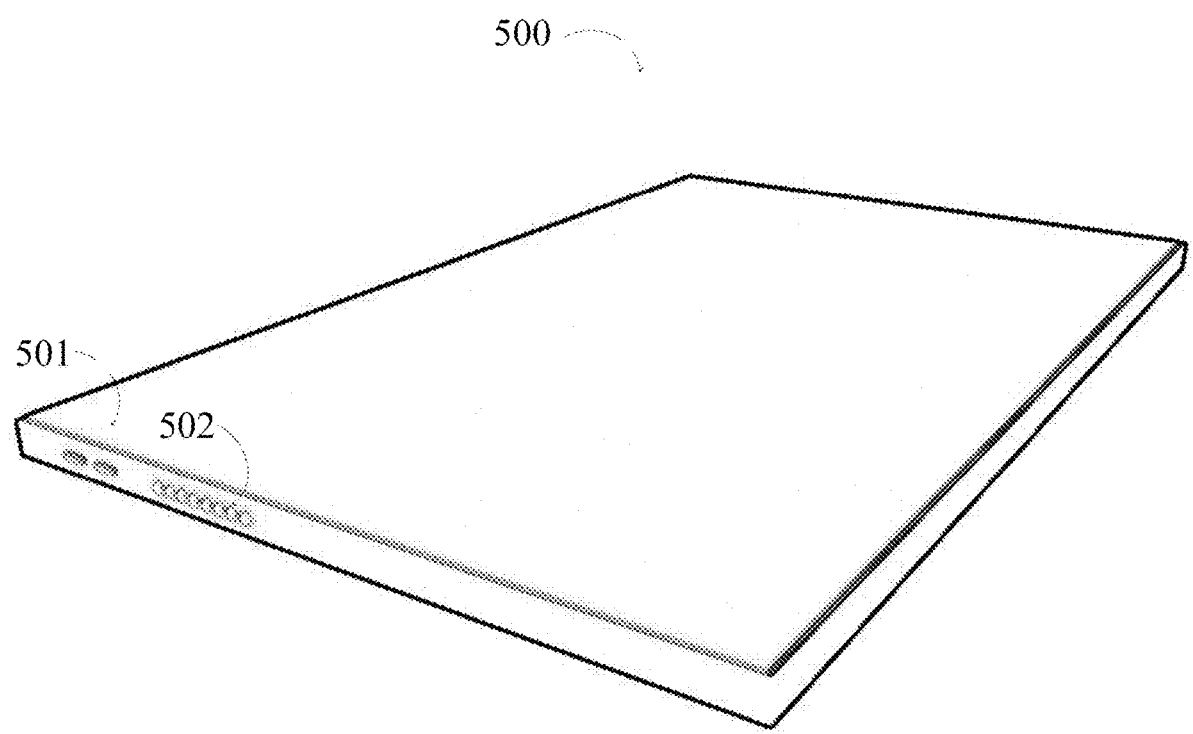

FIG. 5: Portable Raid Online Storage (PROS) Unit shown with the Lid in place.

The top-left side of the Enclosure shows the USB-C connector ports 501.

The middle-left side of the Enclosure show the eight Flash Drive Status lights 502.

The invention claimed is:

1. A printed circuit board ("PCB") having a T shape wherein
the T-shape having a short segment and a long segment perpendicular to the short segment at its midpoint, the T-shape allowing heat dissipation by having inserted NVMe solid state drives sit perpendicular to, and in the same plane as the T shaped PCB and away from, the T shaped PCB allowing heat dissipation into the empty space around the PCB board as contrasted to a rectangular shape PCB.

2. The printed circuit board of claim 1 wherein:
multiple standard NVMe m.2 connectors are attached to and arranged in two parallel rows on the same side of the long segment of the T-shaped PCB, each NVMe m.2 connector being oriented to receive one of the NVMe solid state drive by sliding the NVMe solid state drive parallel to the short segment of the T-shaped PCB and at a right angle to the long segment of the T-shaped PCB and in the same plane as the T shaped PCB.

3. A method of heat dispersion wherein a printed circuit board ("PCB") has a T-shape having a short segment and a long segment perpendicular to the short segment at its midpoint, allowing heat dissipation by having NVMe solid state drives sit perpendicular to and in the same plane as the T shaped PCB and away from, the T shaped PCB allowing heat dissipation into the empty space around the PCB board as contrasted to a rectangular shape PCB.

4. The method of claim 3 wherein:
multiple standard NVMe m.2 connectors are attached to and arranged in two parallel rows on the same side of the long segment of the T-shaped PCB, each NVMe m.2 connector being oriented to receive one of the NVMe solid state drive by sliding the NVMe solid state drive parallel to the short segment of the T-shaped PCB and at a right angle to the long segment of the T-shaped PCB and in the same plane as the T shaped PCB.

\* \* \* \* \*